United States Patent Office 3,386,950
Patented June 4, 1968

3,386,950
STABILIZED POLY(ARYLENE SULFIDES)
Elizabeth G. Horvath and Bertalan Horvath, Bartlesville, Okla., assignors to Phillips Petroleum Company, a corporation of Delaware
No Drawing. Filed Aug. 31, 1965, Ser. No. 484,107
13 Claims. (Cl. 260—45.7)

ABSTRACT OF THE DISCLOSURE

The discoloration of poly(arylene sulfide) resins is reduced or prevented by contacting the resins with a monothiol or polythiol.

---

This invention relates to stabilized poly(arylene sulfides). In one aspect, it relates to poly(arylene sulfides) treated with thiols or polythiols to inhibit discoloration. In another aspect, it relates to compositions of poly(arylene sulfides) and thiols or polythiols resistant to discoloration. In another aspect, it relates to poly(arylene sulfides) resistant to heat induced discoloration by virtue of treatment with thiols or polythiols. In still another aspect, it relates to treating a poly(arylene sulfide) polymer with a color inhibitor by contacting it with a solution of the color inhibitor. In yet another aspect, it relates to inhibition of additional discoloration of a heat treated poly(arylene sulfide) upon further heat treatment by treating the previously heat treated poly(arylene sulfide) with a thiol or polythiol. In another aspect it relates to inhibiting color formation in poly(arylene sulfide) by contacting the poly(arylene sulfide) with a thiol or polythiol, in the liquid or vapor state, at elevated temperatures.

Poly(arylene sulfides) which have not been subjected to elevated temperatures, and which do not contain groups capable of imparting color to the polymers are generally white or light colored. However, during high temperature curing, molding, or other heat treatment the polymers often undergo considerable darkening. This darkening occurs even though air is excluded during the high temperature treatment. For example, although poly(p-phenylene sulfide) does not discolor when subjected to temperatures up to about 290° C. for one hour in a sealed, evacuated container, the polymer does become gray-brown when heated at 365° C. under the same conditions. Since it is frequently desirable to cure these polymers at temperatures as high as 425° C., this curing will result in an undesirable coloration of white or nearly white polymers. The term "curing" as used herein refers to heat treatment of the polymers wherein the molecular weight of the polymer is thus increased.

Furthermore, even cured polymers, i.e., polymers whose molecular weight has been increased by heating and which have been discolored thereby, which are subjected to later heat treatment for the purpose of molding or coating, will undergo even further discoloration. This discoloration is estetically undesirable, and limits the application of these resins in certain specific instances.

It is therefore an object of this invention to provide a method of treating poly(arylene sulfide) resins to reduce their discoloration tendencies. It is a further object of this invention to provide a poly(arylene sulfide) composition with reduced tendency to discolor during heat treatment. It is another object of this invention to provide a cured poly(arylene sulfide) resin of reduced coloration. It is yet another object of this invention to provide a method for treating poly(arylene sulfide) polymers with thiols or polythiols to prevent their subsequent discoloration. It is yet another object of this invention to provide a stabilized poly(arylene sulfide) composition. It is yet another object of this invention to reduce the color of a poly(arylene sulfide) darkened by previous heat treatment.

These and other objects are accomplished by the practice of our invention, which is that discoloration of poly(arylene sulfides) on heat treatment is reduced by conducting said heat treatment in the presence of sulfur containing compounds of the general formulas $$RSH \text{ and } R'(SH)_x$$

wherein R is selected from the group consisting of alkyl, cycloalkyl, alkylcycloalkyl, cycloalkylalkyl, arylalkyl, and arylcycloalkyl radicals containing from 1 to 25 carbon atoms; R' is selected from the group consisting of divalent, trivalent, and tetravalent saturated acyclic hydrocarbon radicals and divalent, trivalent, and tetravalent alicyclic hydrocarbon radicals, including aromatic-substituted saturated acyclic and saturated alicyclic hydrocarbon radicals, such as:

alkylene
cycloalkylene
alkylcycloalkylene
cycloalkylalkylene
arylalkylene
arylcycloalkylene
alkanetriyl
cycloalkanetriyl
arylalkanetriyl
alkanetetrayl
cycloalkanetetrayl
arylalkanetetrayl and the like, containing from 2–25 carbon atoms; and $x$ is an integer from 2–4.

Furthermore, discoloration already present in the polymer can be reduced by the presence of a thiol or polythiol.

Specifically, some examples of thiols of the first general formula which are useful include:

methanethiol
ethanethiol
2-propanethiol
1-butanethiol
2-hexanethiol
1-octanethiol
3-decanethiol
1-dodecanethiol
4-methyl-2-tetradecanethiol
5-ethyl-1-hexadecanethiol
1-eicosanethiol
2-docosanethiol
1-pentacosanethiol
cyclohexanethiol
cyclooctanethiol
cyclodecanethiol
cyclododecanethiol
cyclohexadecanethiol
2-methylcyclododecanethiol
3-ethylcyclododecanethiol
cyclodecylmethanethiol
2-cyclododecylethanethiol
α-toluenethiol
4-phenyl-1-butanethiol
1-phenyl-3-hexanethiol
2-phenylcyclopentanethiol
3-phenylcyclodecanethiol.

Generally, those thiols containing from 10 to 20 carbon atoms are preferred.

Some example of polythiols which are useful include:

1,2-ethanedithiol
1,2-butanedithiol
1,6-hexanedithiol
2,3-octanedithiol
1,10-decanedithiol
5-methyl-1,3-dodecanedithiol
3-ethyl-1,5-tetradecanedithiol
1,20-eicosanedithiol
1,25-pentacosanedithiol
1,4-cyclohexanedithiol
1,2-cyclodecanedithiol
1,5-cyclododecanedithiol
1,3-cyclohexadecanedithiol
2-methyl-1,4-cyclodecanedithiol
4-ethyl-1,2-cycldodecanedithiol
2-cyclopentyl-1,5-pentanedithiol
1-cyclohexyl-2,3-octanedithiol
2-phenyl-1,4-butanedithiol
1-phenyl-2,3-octanedithiol
4-phenyl-1,2-cyclohexanedithiol
5-phenyl-1,3-cyclooctanedithiol
1,2,3-propanetrithiol
3-methyl-1,3,6-hexanetrithiol
1,2,4-cyclohexanetrithiol
2-ethyl-1,3,4-cyclooctanetrithiol
2-phenyl-1,2,3-butanetrithiol
1,2,3,4-butanetetrathiol
2-methyl-1,2,3,4-butanetetrathiol
1,3,5,7-cyclooctanetetrathiol
2-ethyl-1,2,3,4-cyclohexanetetrathiol
1-phenyl-1,2,3,5-hexanetetrathiol.

Generally, those polythiols containing not more than 12 carbon atoms are preferred.

Although the heat treatment of the poly(arylene sulfides) can be carried out over a rather broad temperature range, depending in part on the nature of the polymer and on the polymer properties desired, the heat treatment is generally conducted at a temperature of about 300–425° C., usually at a temperature of about 320–400° C. The heat treatment is usually carried out for a period of about 1–24 hours, generally for a period of about 2–8 hours. The heat treatment is advantageously carried out at reduced pressure, preferably at a pressure less than 200 mm. Hg. In some instances, higher pressures can be employed satisfactorily by passing an inert gas such as nitrogen, helium, or the like through or over the polymer to aid in the removal of more volatile components. However, when the more volatile thiols or polythiols are employed, the heat treatment should be carried out in a closed system to prevent loss of the additive through volatilization.

The thiol or polythiol can be incorporated in the polymer prior to heat treatment in any convenient manner. For example, the thiol or polythiol can be added as such to the polymer, and the resulting mixture can be agitated in any suitable manner to achieve good mixing. A particularly convenient manner of introducing the thiol or polythiol into the polymer is the addition of the thiol or polythiol dissolved in a volatile solvent such as hexane, benzene, ether, acetone, ethanol, and the like, with subsequent volatilization of the solvent. Although the amount of thiol or polythiol used can vary over a broad range, the thiol or polythiol will generally be employed in an amount varying from about 2 to about 20 weight percent, preferably from about 4 to about 10 weight percent, of the polymer to be heat-treated.

The process of our invention is also useful in treatment of previously cured poly(arylene sulfides), which normally are quite dark in color. When such cured polymers are subjected to heat treatment, as in molding or coating techniques, the presence of the thiol or polythiol causes the polymer to become lighter in color than either the original cured polymer, or the cured polymer with subsequent heat treatment in the absence of the thiol.

As a further embodiment of our invention, heat treatment of the polymer and color stabilization or reduction with the thiol or polythiol can be accomplished concurrently by contacting the polymer with the thiol or polythiol at elevated temperatures, e.g., at temperatures of about 150–400° C., preferably about 200–370° C., for a period of about 1 hour to about 24 hours, preferably about 3 hours to about 12 hours.

Example I

A mixture of 1351 g. of sodium sulfide nonahydrate and 2900 ml. of N-methyl-2-pyrrolidone was heated in a stirred reactor equipped with a condenser until 1580 ml. of distillate was collected. This preliminary heating was for the purpose of removing water of hydration from the sodium sulfide nonanhydrate. Then 811 g. of p-dichlorobenzene and 680 ml. of N-methyl-2-pyrrolidone were added to the residue, the latter being added to compensate for the loss of this solvent in the distillate. The reactor was then sealed, and the contents of the reactor were heated at 500° F. (260° C.) for 2 hours. The reaction mixture was then cooled and filtered, and the solid polymer was washed with acetone, then with water. The washed polymer was next heated with water at 320° F. (160° C.) for 80 minutes, after which the mixture was filtered. The separated polymer was washed with acetone and vacuum-dried at 180° F. (82° C.). The resulting white purified poly(p-phenylene sulfide) weighed 515 g.

Example II

A 20-g. sample of the poly(p-phenylene sulfide) of Example I was treated with approximately 200 ml. of ether containing 1 g. of 1-dodecanethiol. The resulting slurry was then heated by means of a heat lamp to remove the ether. A portion of the dry polymer powder was heated at 365° C. for 1 hour in an evacuated sealed glass tube. A sample of the poly(p-phenylene sulfide) which had not been treated with the ether solution of 1-dodecanethiol was heated at 365° C. for 1 hour in another evacuated sealed tube, thus serving as a control. The resulting partially cured polymer which had been treated with 1-dodecanethiol was off-white in color. In contrast, the resulting partially cured polymer which had not been treated with 1-dodecanethiol was gray-brown. Thus, the use of 1-dodecanethiol made possible the production of a heat treated polymer much lighter in color than that obtained in the absence of the thiol.

Example III

A mixture of 900 g. of commercial flake sodium sulfide (containing 25.2 weight percent sulfur sulfide) and 2500 ml. of N-methyl-2-pyrrolidone was heated in a stirred reactor equipped with a condenser until 200 ml. of distillate was colected. Then 1030 g. of p-dichlorobenzene dissolved in 1 liter of N-methyl-2-pyrrolidone was added to the residue. The reactor was then sealed, and the contents of the reactor was heated at 500° F. for 2 hours. The reaction mixture was cooled and filtered, and the solid polymer was washed with acetone, then with cold water, and then with hot water, after which the polymer was maintained in water at 335° F. for 2 hours. The mixture was filtered hot, and the polymer was soaked with methanol after which the polymer was filtered from the methanol and vacuum-dried at 160° F. The resulting dried poly(p-phenylene sulfide) weighed 660 g.

A portion of the dried polymer above was cured by heating at 365° C. for 3.5 hours under a pressure of less than 1 mm. Hg, giving very dark, cured poly(p-phenylene sulfide).

Example IV

A 10-g. sample of the very dark, cured poly(p-phenylene sulfide) prepared in Example III was heated in 50 ml. of boiling 1-dodecanethiol for approximately 10 hours.

The resulting polymer was lighter in color than was the polymer prior to treatment with the 1-dodecanethiol.

Example V

Poly(p-phenylene sulfide), prepared in a manner similar to that shown in Example I, was cured by heating at 365° C. for 3.5 hours under a pressure of less than 1 mm. Hg, and the resulting very dark polymer was molded at 625–650° F. for 0.5 hour under a pressure of 30,000 p.s.i.g. A 0.36-g. sample of the dark, molded polymer was heated at atmospheric pressure for 6 hours in the liquid phase of 5 g. of boiling 1,6-hexanedithiol (B.P. 237° C.), whereupon the color of the polymer was reduced to an off-white.

The process of this invention is useful with poly(arylene sulfides) generally, regardless of the method of preparation. It may be used, for example, with poly(arylene sulfide) resins prepared as described in U.S. Patent 2,513,188, wherein polyhalo aromatic compounds are reacted with sulfur and a metal sulfide at fusion temperatures. It can also be used with resins manufactured by the method described in British Patent 962,941, wherein metal salts of halothiophenols are heated at a polymerizing temperature. Our invention is especially useful with polymers prepared by the solution reaction of polyhalo compounds with metal sulfides as described in copending application Ser. No. 327,143, filed Nov. 27, 1963, now U.S. Patent No. 3,354,129.

Reasonable variation and modification are possible within the scope of the foregoing invention, the essence of which is that poly(arylene sulfides) are contacted with thiols or polythiols to reduce discoloration.

We claim:

1. The composition of matter comprising a poly(arylene sulfide) and a compound selected from the group consisting of $$RSH \text{ and } R'(SH)_x$$

wherein R is selected from the group consisting of alkyl, cycloalkyl, alkylcycloalkyl, cycloalkylalkyl, arylalkyl, and arylcycloalkyl radicals having 1 to 25 carbon atoms, and R' is selected from the group consisting of divalent, trivalent, and tetravalent acylic hydrocarbon radicals and divalent, trivalent, and tetravalent alicyclic hydrocarbon radicals having 2 to 25 carbon atoms, and $x$ is an integer from 2 to 4.

2. The composition of matter comprising poly(p-phenylene sulfide) and 1-dodecanethiol.

3. The composition of matter comprising poly(p-phenylene sulfide) and 1,6-hexanedithiol.

4. The composition of claim 1 wherein the amount of said compound ranges from about 2 to about 20 weight percent of the poly(arylene sulfide).

5. The method of reducing discoloration of discolored poly(arylene sulfide) resins comprising contacting said resins with a compound selected from the group consisting of $$RSH \text{ and } R'(SH)_x$$

wherein R is selected from the group consisting of alkyl, cycloalkyl, alkylcycloalkyl, cycloalkylalkyl, arylalkyl, and arylcycloalkyl radicals having 1 to 25 carbon atoms, and R' is selected from the group consisting of divalent, trivalent, and tetravalent acrylic hydrocarbon radicals and divalent, trivalent, and tetravalent alicyclic hydrocarbon radicals having 2 to 25 carbon atoms, and $x$ is an integer from 2 to 4.

6. The method of claim 5 wherein said contacting occurs subsequent to curing of said resins.

7. The method of claim 5 wherein said contacting occurs at a temperature of about 150 to about 400° C.

8. The method of reducing discoloration of discolored poly(arylene sulfide) resins comprising contacting said resins with 1,6-hexanedithiol or 1-dodecanethiol.

9. The method of reducing discoloration of discolored poly(p-phenylene sulfide) resins comprising contacting said resins with 1-dodecanethiol or 1,6-hexanedithiol.

10. The method of preventing discoloration of poly(arylene sulfide) resins which comprises contacting said resins with a volatile solvent having dissolved therein a thiol or polythiol selected from the group consisting of $$RSH \text{ and } R'(SH)_x$$

wherein R is selected from the group consisting of alkyl, cycloalkyl, alkylcycloalkyl, cycloalkylalkyl, arylalkyl, and arylcycloalkyl radicals having 1 to 25 carbon atoms, and R' is selected from the group consisting of divalent, trivalent, and tetravalent acylic hydrocarbon radicals and divalent, trivalent, and tetravalent alicyclic hydrocarbon radicals having 2 to 25 carbon atoms, and $x$ is an integer from 2 to 4, and heating to volatilize and remove said solvent from said resin.

11. The method of claim 10 wherein said resin is a poly(p-phenylene sulfide), said solvent is ether, and said thiol compound is 1-dodecanethiol or 1,6-hexanedithiol.

12. The method of reducing discoloration of poly(arylene sulfide) and preventing additional discoloration during heat treatment comprising heat treating said poly(arylene sulfide) by contacting same with a boiling thiol or polythiol compound selected from the group consisting of $$RSH \text{ and } R'(SH)_x$$

wherein R is selected from the group consisting of alkyl, cycloalkyl, alkylcycloalkyl, cycloalkylalkyl, arylalkyl, and arylcycloalkyl radicals having 1 to 25 carbon atoms, and R' is selected from the group consisting of divalent, trivalent, and tetravalent acylic hydrocarbon radicals and divalent, trivalent, and tetravalent alicyclic hydrocarbon rdicals having 2 to 25 carbon atoms, and $x$ is an integer from 2 to 4.

13. The method of claim 12 wherein said poly(arylene sulfide) is poly(p-phenylene sulfide) and said thiol compound is 1-dodecanethiol or 1,6-hexanedithiol.

References Cited

UNITED STATES PATENTS 2,960,538  11/1960  May et al. _____ 260—45.7
3,287,329  11/1966  Slovinsky _____ 260—45.7

DONALD E. CZAJA, *Primary Examiner.*

M. J. WELSH, *Assistant Examiner.*